US00RE48720E

(19) United States
(12) Reissued Patent
Liu

(10) Patent Number: US RE48,720 E
(45) Date of Reissued Patent: Sep. 7, 2021

(54) CUTTER HEAD ASSEMBLY FOR A WOOD PLANING MACHINE

(71) Applicant: SHINMAX INDUSTRY CO., LTD., Taichung (TW)

(72) Inventor: Chin-Yuan Liu, Taichung (TW)

(73) Assignee: SHINMAX INDUSTRY CO., LTD., Taichung (TW)

(21) Appl. No.: 16/989,524

(22) Filed: Aug. 10, 2020

Related U.S. Patent Documents

Reissue of:
(64) Patent No.: 10,421,211
Issued: Sep. 24, 2019
Appl. No.: 15/596,347
Filed: May 16, 2017

(30) Foreign Application Priority Data

Jun. 1, 2016 (TW) ..... 105208199

(51) Int. Cl.
*B27C 1/02* (2006.01)
*B27G 13/04* (2006.01)

(52) U.S. Cl.
CPC ..... *B27C 1/02* (2013.01); *B27G 13/04* (2013.01)

(58) Field of Classification Search
CPC .. B27C 1/02; B27C 1/00; B27C 1/005; B27C 1/007; B27C 1/04; B27C 1/06; B27C 1/08; B27C 1/14; B27G 13/04; B27G 13/00; B27G 13/02; B27G 13/06; B27G 13/10; B27G 13/12; B23G 2200/10; Y10T 407/1628; B02C 18/186
See application file for complete search history.

(56) References Cited

U.S. PATENT DOCUMENTS

| | | | | | |
|---|---|---|---|---|---|
| 987,479 | A * | 3/1911 | Mitchell | B27G 13/04 | 144/117.1 |
| 4,280,542 | A * | 7/1981 | Alessio | B27G 13/04 | 144/230 |
| 4,347,882 | A * | 9/1982 | Bachmann | B27G 13/04 | 144/225 |
| 4,557,305 | A * | 12/1985 | Berger | B27G 13/04 | 144/117.1 |
| 4,572,259 | A * | 2/1986 | Bergler | B27G 13/10 | 144/230 |
| 4,700,481 | A * | 10/1987 | Barrett | B27G 13/04 | 30/475 |

(Continued)

FOREIGN PATENT DOCUMENTS

TW 405511 U 7/1988

OTHER PUBLICATIONS

Preliminary Search Report of Utility Model Technical Opinion on 105208199e01 and 105208199e02, dated Apr. 27, 2020, ssued by the Taiwan Intellectual Property Office, 35 pages in Chinese, 1 page English abstract.

*Primary Examiner* — William C Doerrler
(74) *Attorney, Agent, or Firm* — Juan Carlos A. Marquez; Marquez IP Law Office, PLLC

(57) ABSTRACT

A cutter head assembly includes a drive shaft, a blade carrier and a blade unit. The drive shaft has a longitudinal axis and is made of steel. The blade carrier is sleeved and retained on the drive shaft. The blade carrier has a length extending parallel to the longitudinal axis and is made of aluminum alloy. The blade unit is disposed on the blade carrier and surrounds the longitudinal axis.

39 Claims, 11 Drawing Sheets

(56) References Cited

U.S. PATENT DOCUMENTS

| | | | | |
|---|---|---|---|---|
| 5,904,193 | A * | 5/1999 | Kellner | B27G 13/04 144/218 |
| 7,708,038 | B1 * | 5/2010 | Stewart | B23C 5/04 144/117.1 |
| 7,954,523 | B2 * | 6/2011 | Liu | B27G 13/04 144/117.1 |
| 9,375,718 | B2 * | 6/2016 | Habib | B02C 4/08 |
| 10,259,136 | B2 | 4/2019 | Liu | |
| 2010/0282365 | A1 * | 11/2010 | Liu | B27G 13/04 144/117.1 |
| 2015/0375417 | A1 * | 12/2015 | Liu | B27G 13/04 144/225 |

* cited by examiner

CUTTER HEAD ASSEMBLY FOR A WOOD PLANING MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims priority of Taiwanese Patent Application Number 105208199, filed on Jun. 1, 2016.

FIELD

The disclosure relates to a cutter head, more particularly to a cutter head assembly for a wood planing machine.

BACKGROUND

A conventional cutter head assembly for a wood planing machine includes a drive shaft, a blade carrier and a plurality of cutting blades. The drive shaft has a longitudinal axis. The blade carrier surrounds the drive shaft, extends parallel to the longitudinal axis, and is retained on the drive shaft. The cutting blades are spacedly disposed on the blade carrier and surround the longitudinal axis. Each of the drive shaft and the blade carrier is made of iron, so that the weight of the conventional cutter head assembly is heavy. Further, after using the conventional cutter head assembly for a long period of time, the blade carrier may rust, and the cutting blades disposed on the blade carrier may loosen. Moreover, the cost of the iron blade carrier is expensive.

SUMMARY

Therefore, an object of the present disclosure is to provide a cutter head assembly that is lightweight, that will not easily rust and that has a low cost.

According to this disclosure, a cutter head assembly comprises a drive shaft, a blade carrier and a blade unit. The drive shaft has a longitudinal axis and is made of steel. The blade carrier is sleeved and retained on the drive shaft. The blade carrier has a length extending parallel to the longitudinal axis and is made of aluminum alloy. The blade unit is disposed on the blade carrier and surrounds the longitudinal axis.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
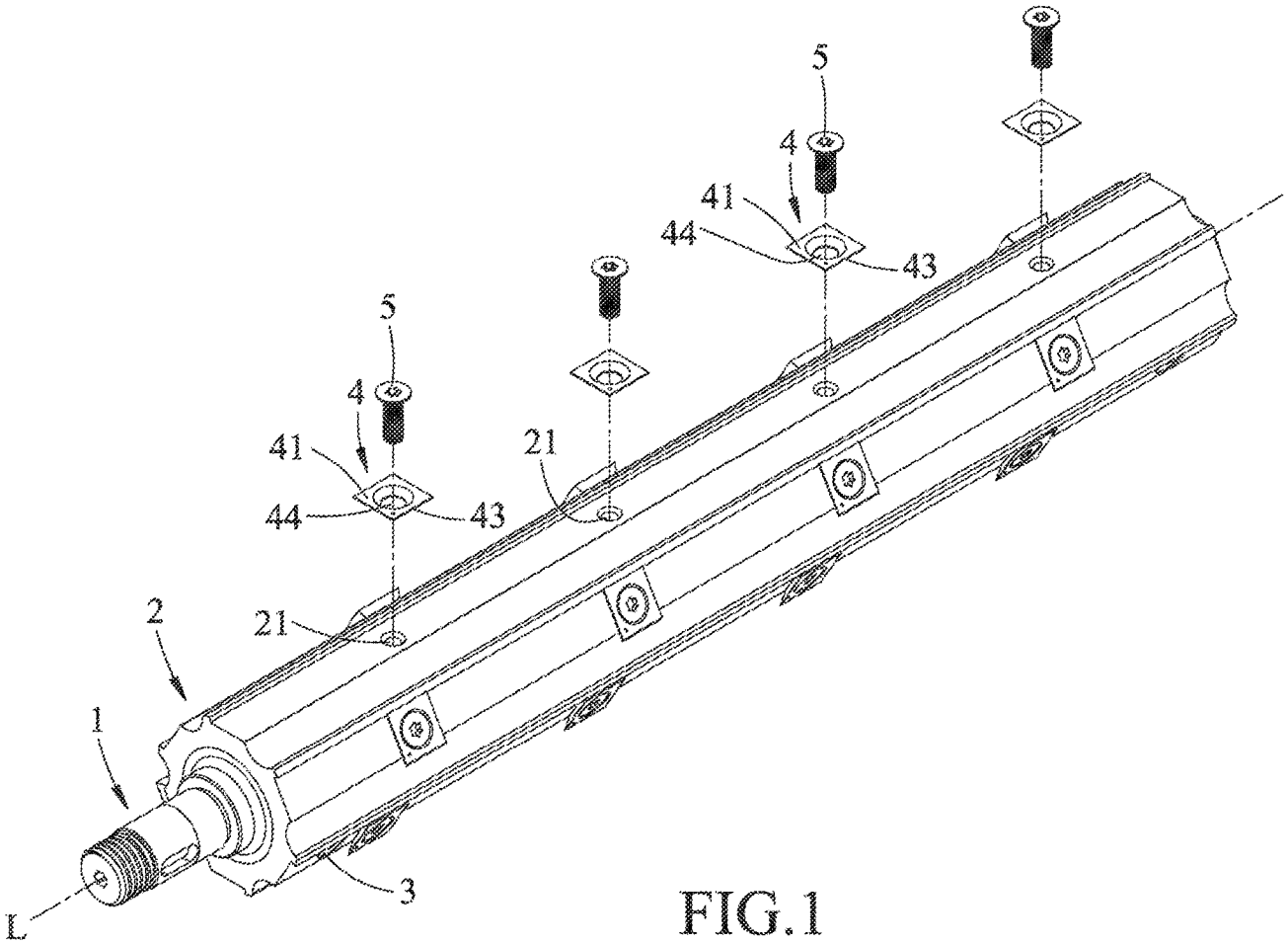
FIG. 1 is a partial exploded perspective view of a cutter head assembly according to the first embodiment of the present disclosure.

Before the present disclosure is described in greater detail with reference to the accompanying embodiments, it should be noted herein that like elements are denoted by the same reference numerals throughout the disclosure.

Figure 2:
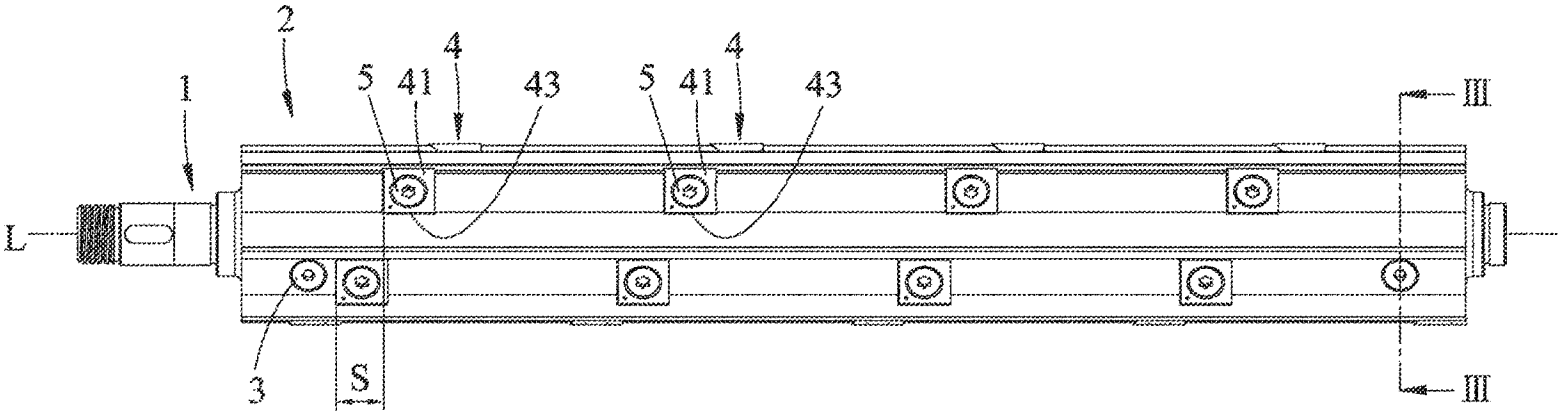
FIG. 2 is a top view of the first embodiment.
Figure 3:
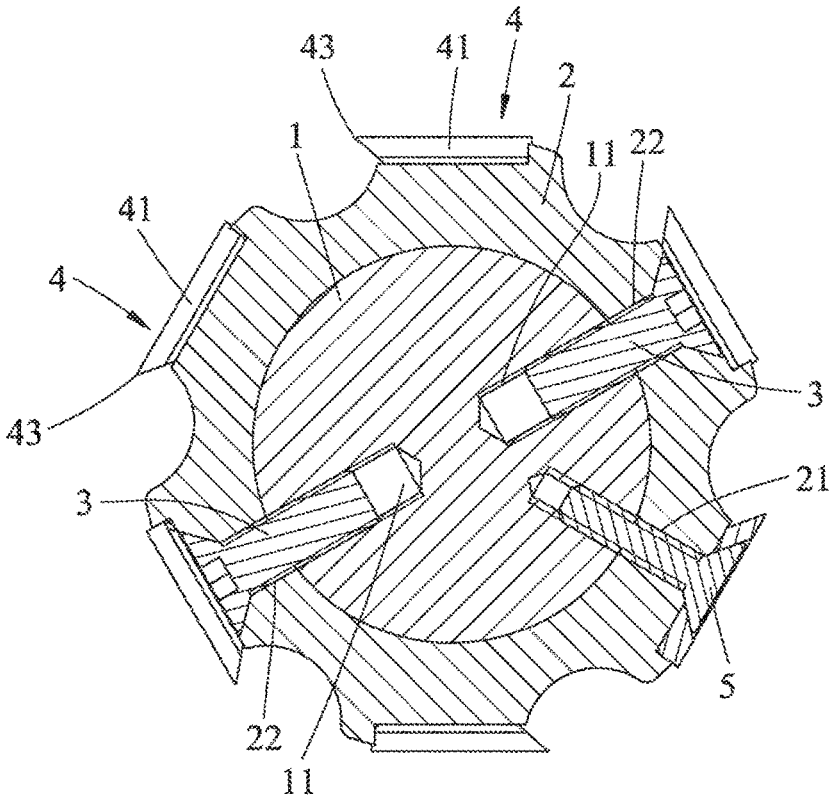
FIG. 3 is a sectional view of the first embodiment taken along line III-III of FIG. 2.

Referring to FIGS. 1 to 3, a cutter head assembly for a wood planing machine according to the first embodiment of the present disclosure is shown to comprise a drive shaft 1, a blade carrier 2, a plurality of positioning members 3, a blade unit, and a plurality of fastening members 5.

The drive shaft 1 is made of steel, and has a longitudinal axis (L), and a plurality of first positioning sections 11 each of which is configured as a threaded groove extending inwardly from an outer surface thereof.

The blade carrier 2 is made of aluminum alloy, is sleeved and retained on the drive shaft 1, and has a length extending parallel to the longitudinal axis (L). The blade carrier 2 includes a plurality of spaced-apart fastening holes 21 surrounding the longitudinal axis (L), and a plurality of second positioning sections 22 each of which is configured as a threaded hole communicating with a respective one of the first positioning sections 11.

Each of the positioning members 3 is fixed between one of the first positioning sections 11 and a corresponding one the second positioning sections 22. In this embodiment, each positioning member 3 is configured as a threaded bolt, and the number thereof is four, each two of which are disposed on the same sectional surface (see FIG. 3) of the drive shaft 1. The number of the first positioning section 11 is four disposed on two opposite end portions of the drive shaft 1. The number of the second positioning section 22 is four which respectively communicate with the first positioning sections 11 for extension of the positioning members 3 therethrough. In an alternative embodiment, the positioning members 3 may lie on the different sectional surfaces of the drive shaft 1. Further, the number of each of the first positioning section 11, the second positioning section 22 and the positioning member 3 may be one, and is not limited to the aforesaid disclosure. With each positioning member 3 extending through one of the second positioning sections 22 and fixedly engaging a corresponding one of the first positioning sections 11, rotational displacement of the blade carrier 2 relative to the drive shaft 1 can be prevented.

The blade unit includes a plurality of cutting blades 4 surrounding the longitudinal axis (L) and spacedly disposed on the blade carrier 2. Each of the cutting blades 4 includes a blade body 41, at least one cutting edge 43 formed on a longitudinal side of the blade body 41, and a through hole 44 communicating with a respective one of the fastening holes 21. A distance (S) (see FIG. 2) along the longitudinal axis (L) of the drive shaft 1 and between the cutting edges 43 of two adjacent ones of the cutting blades 4 that are circumferentially spaced apart from each other is smaller than a length of each of the cutting edges 43 along the longitudinal axis (L). In this embodiment, the number of the cutting edge 43 of each cutting blade 4 is one, but may be two, and is not limited to the aforesaid disclosure.

Each of the fastening members 5 is configured as a threaded bolt that extends through the through hole 44 of a respective one of the cutting blades 4 and that engages threadedly and detachably a corresponding one of the fastening holes 21 so as to fasten each cutting blade 4 to the blade carrier 2.

Figure 4:
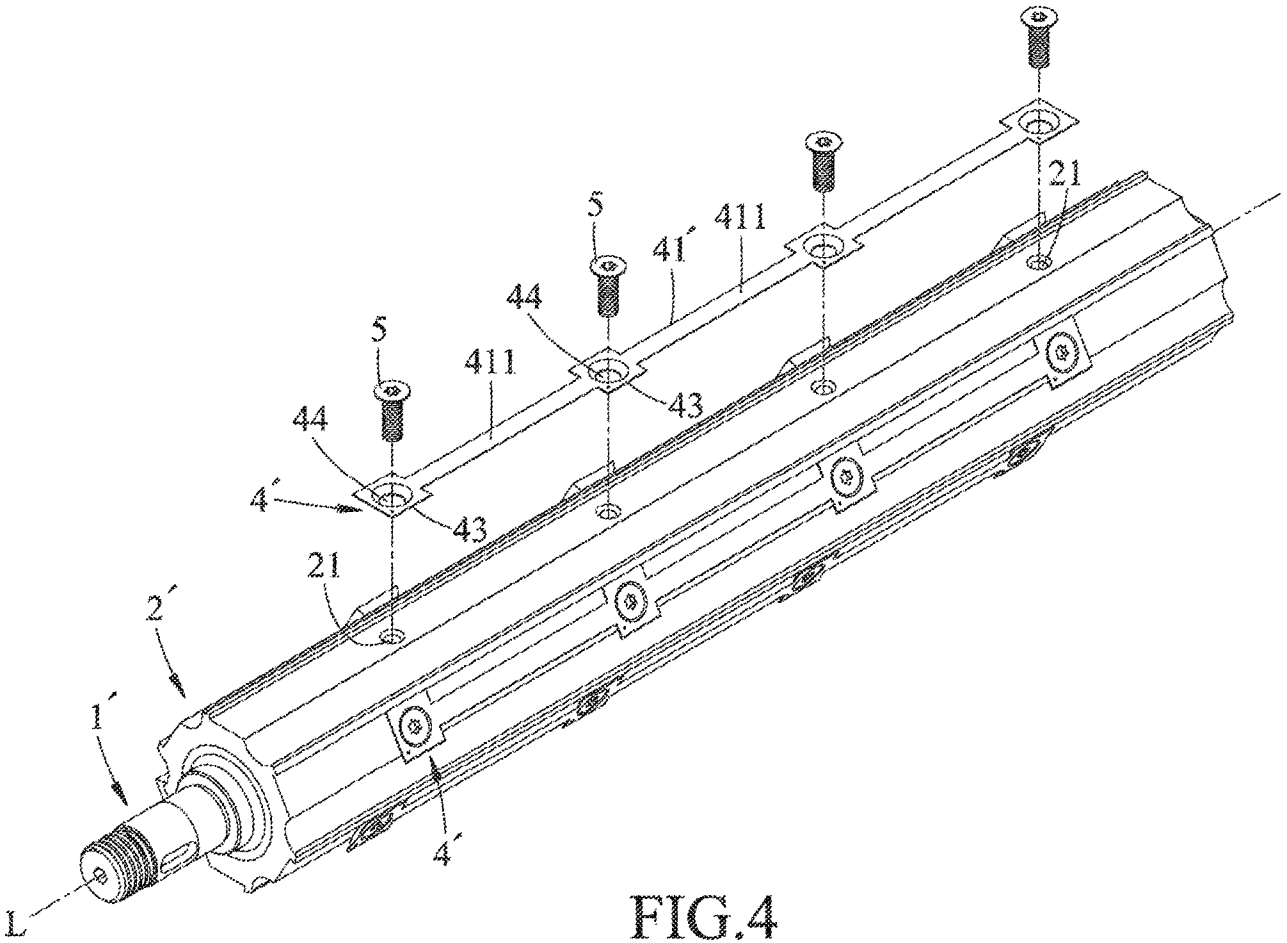
FIG. 4 is a partial exploded perspective view of a cutter head assembly according to the second embodiment of the present disclosure.
Figure 5:
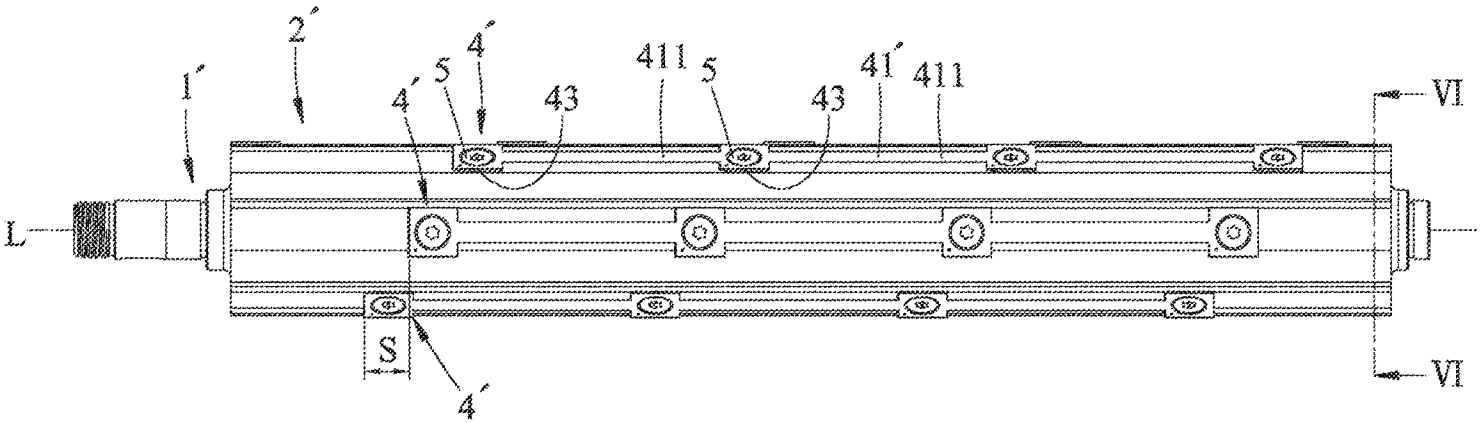
FIG. 5 is a top view of the second embodiment.
Figure 6:
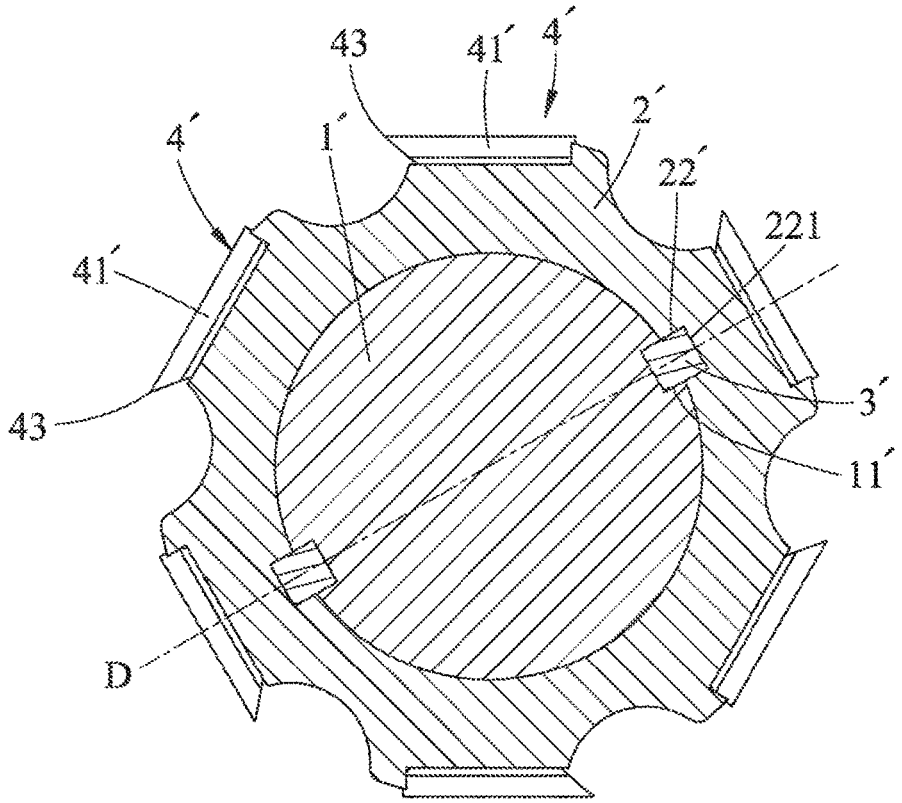
FIG. 6 is a sectional view of the second embodiment taken along line VI-VI of FIG. 5.

Referring to FIGS. 4 to 6, the second embodiment of the cutter head assembly of this disclosure is shown to be similar to the first embodiment, and the difference between the two resides in that each positioning member 3' of the second embodiment is configured as a rod extending parallel to the longitudinal axis (L), each first positioning section 11' is configured as an inner engaging groove extending along the length of the drive shaft 1', and each second positioning section 22' is configured as an outer engaging groove extending along the length of the blade carrier 2'. Each first positioning section 11' cooperates with a respective one of the second positioning sections 22' to define a receiving space 221 for receiving a respective one of the positioning members 3' therein. In this embodiment, the number of each of the positioning member 3', the first positioning section 11', the second positioning section 22' and the receiving space 221 is two, which are opposite to each other along a radial direction (D) (see FIG. 6) of the drive shaft 1'. Alternatively, the number of each of the positioning member 3', the first positioning section 11', the second positioning section 22' and the receiving space 221 may be one, and is not limited to the aforesaid disclosure. With each positioning member 3' being received in the receiving space 221 defined by and being fixed between the corresponding first and second positioning sections 11', 22', the blade carrier 2' cannot rotate relative to the drive shaft 1'.

The blade body 41' of each cutting blade 4' of this embodiment is elongated, and extends parallel to the longitudinal axis (L). Each cutting blade 4' includes four cutting edges 43 formed on one longitudinal side of the blade body 41' and spaced apart from each other along the length thereof, and three spacer sections 411 each of which is disposed between two adjacent ones of the cutting edges 43. A distance (S) (see FIG. 5) along the longitudinal axis (L) of the drive shaft 1' and between the cutting edges 43 of two adjacent ones of the cutting blades 4' that are circumferentially spaced apart from each other is smaller than a length of each cutting edge 43 along the longitudinal axis (L). In this embodiment, the number of the cutting edge 43 of each cutting blade 4' is four, but may be eight, each four of which is formed on a corresponding longitudinal side of the cutting blade 4', and is not limited to the aforesaid disclosure. Through the presence of the spacer sections 411, the stability of the cutting blades 4' can be enhanced when in contact with a workpiece during planing.

Figure 7:
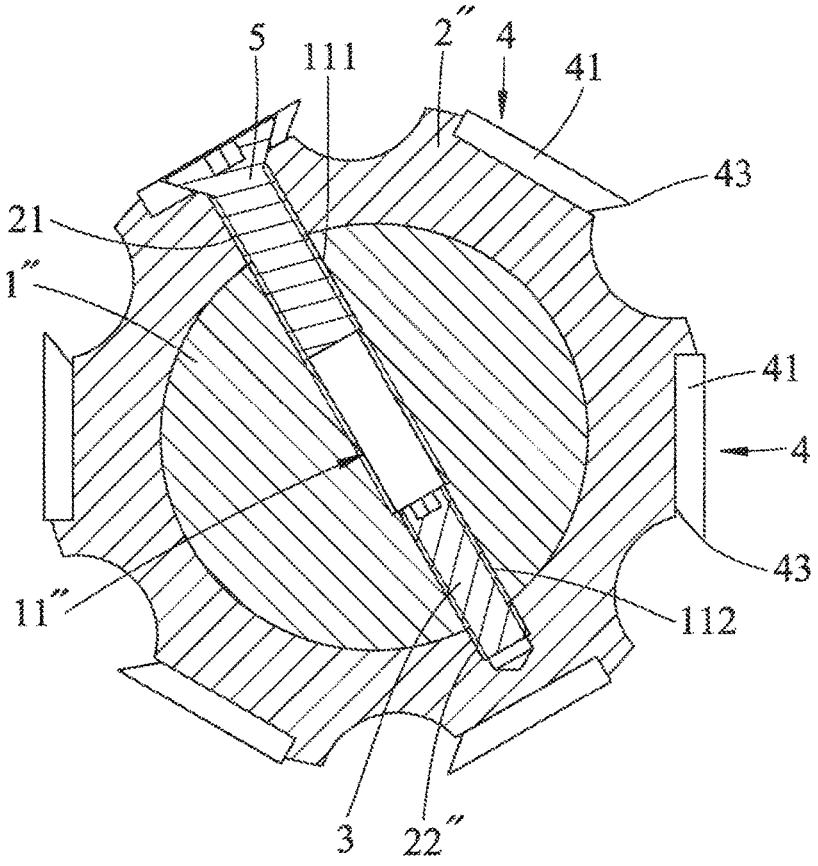
FIG. 7 is a view similar to FIG. 6, but illustrating a cutter head assembly according to the third embodiment of the present disclosure.

Referring to FIG. 7, the third embodiment of the cutter head assembly of this disclosure is shown to be similar to the first embodiment. The difference between the first and third embodiments resides in that the first positioning section 11" of the drive shaft 1" of the third embodiment is configured as a through hole extending through the drive shaft 1" and having a large-diameter portion 111 and a small-diameter portion 112 opposite to and communicating with the large-diameter portion 111. The second positioning section 22" of the blade carrier 2" is configured as a threaded blind hole formed in an inner surface of the blade carrier 2" and communicating with the small-diameter portion 112. The fastening hole 21 communicates with the large-diameter portion 111.

During assembly of the third embodiment, the positioning member 3 extends through the fastening hole 21 and the large-diameter portion 111, and is threaded through the small-diameter portion 112 to fixedly engage with the second positioning section 22", so that the blade carrier 2" cannot rotate relative to the drive shaft 1". Next, the fastening member 5 is inserted through the through hole 44 in the blade body 41, and is threaded through the fastening hole 21 to fixedly engage with the large-diameter portion 111, thereby fixedly fastening the cutting blade 4 to the blade carrier 2".

Because the positioning member 3 is threadedly engaged between the small-diameter portion 112 and the second positioning section 22", the positioning member 3 is hidden within the drive shaft 1". When the cutting edge 43 of the cutting blade 4 becomes blunt due to planing of the workpiece for a long period of time and needs to be replaced, a user will not mistakenly remove the positioning member 3 for the fastening member 5, so that separation of the drive shaft 1" and the blade carrier 2" can be prevented.

Figure 8:
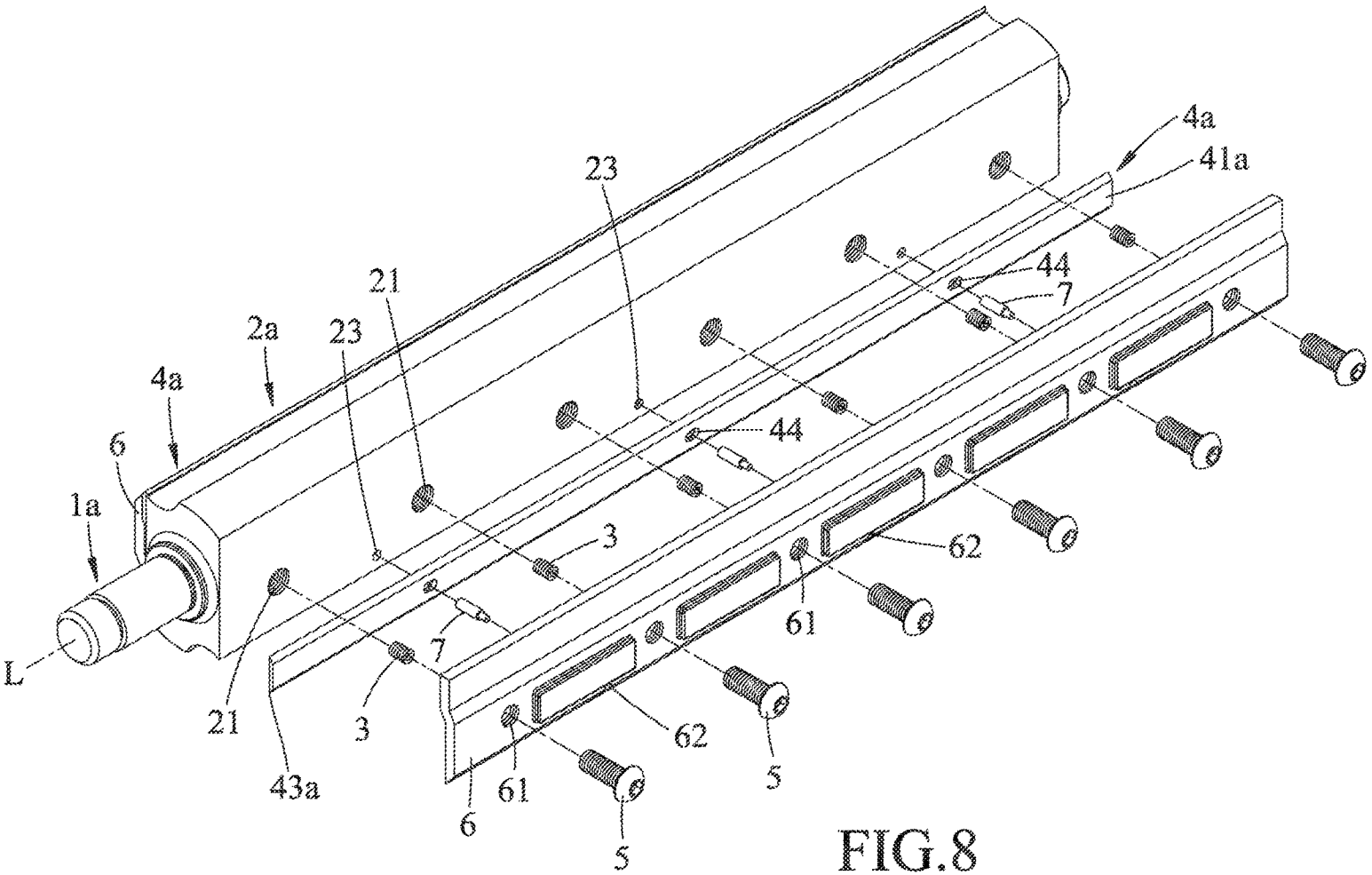
FIG. 8 is an exploded perspective view of a cutter head assembly according to the fourth embodiment of the present disclosure.
Figure 9:
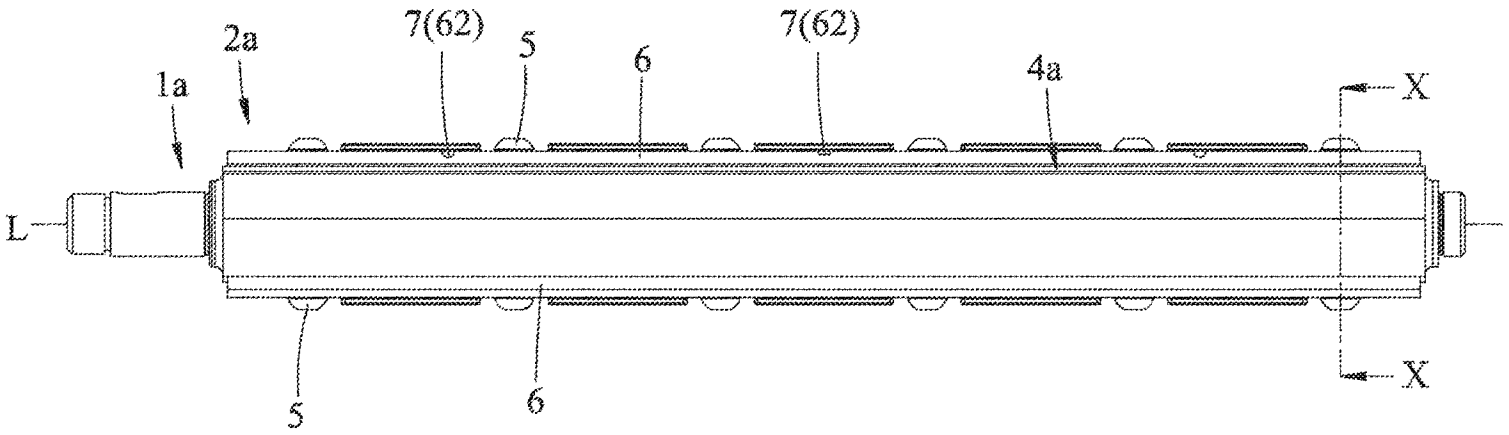
FIG. 9 is a top view of the fourth embodiment.
Figure 10:
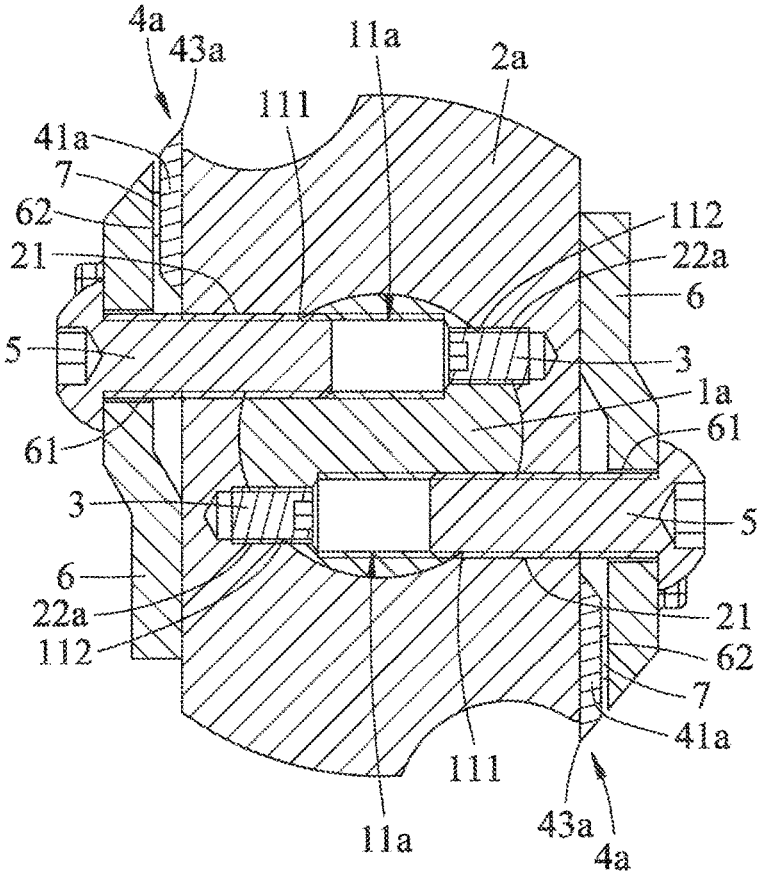
FIG. 10 is a sectional view of the fourth embodiment taken along line X-X of FIG. 9.

Referring to FIGS. 8 to 10, the fourth embodiment of the cutter head assembly of this disclosure is shown to comprise a drive shaft (1a), a blade carrier (2a), a plurality of positioning members 3, a blade unit, a plurality of fastening members 5, two pressing members 6 and a plurality of fixing members 7.

The drive shaft (1a) is made of steel, and has a longitudinal axis (L), a circular cross section, and two rows of first positioning sections (11a) extending through the drive shaft (1a) and spaced apart from each other. Each of the first positioning sections (11a) is configured as a through hole having a large-diameter portion 111 and a small-diameter portion 112 opposite to and communicating with the large-diameter portion 111.

The blade carrier (2a) is made of aluminum alloy, has a length extending parallel to the longitudinal axis (L), and is sleeved and retained on the drive shaft (1a). The blade carrier (2a) includes two rows of fastening holes 21 each row of which communicates with a respective one of the rows of the first positioning sections (11a), two rows of second positioning sections (22a) each row of which is opposite to a respective one of the rows of the fastening holes 21, and a plurality of main fixing holes 23 spaced apart from each other along the length of the blade carrier (2a). Specifically, each of the fastening holes 21 communicates with the large-diameter portion 111 of a respective one of the first positioning sections (11a), each of the second positioning sections (22a) is configured as a threaded blind hole formed in an inner surface of the blade carrier (2a) and communicating with the small-diameter portion 112 of the respective first positioning section (11a), and each of the main fixing holes 23 is disposed between two adjacent ones of the fastening holes 21.

Each of the positioning members 3 of this embodiment is configured as a threaded bolt. As shown in FIG. 10, each positioning member 3 extends through the fastening hole 21 and the large-diameter portion 111, and is threaded through the small-diameter portion 112 to fixedly engage with the second positioning section (22a), so that the blade carrier (2a) cannot rotate relative to the drive shaft (1a).

The blade unit of this embodiment includes two cutting blades (4a) respectively disposed on the two rows of the fastening holes 21. Each cutting blade (4a) includes an elongated blade body (41a) extending parallel to the longitudinal axis (L), a cutting edge (43a) formed on a longitudinal side of the blade body (41a), and three through holes 44 extending through the blade body (41a) and spaced apart from each other along the length thereof. The number of the through hole 44 may vary depending on the requirement, and is not limited to the aforesaid disclosure.

The pressing members 6 are respectively disposed on the rows of the fastening holes 21 and are fastened to the blade carrier (2a). Each of the pressing members 6 includes a plurality of threaded holes 61 corresponding to the fastening holes 21, and a plurality of auxiliary fixing holes 62 corresponding to the main fixing holes 23.

Each of the fastening members 5 is threaded through one of the threaded holes 61, and is detachably fastened to a corresponding one of the fastening holes 21. When the fastening members 5 are fastened to the respective fastening holes 21, each pressing member 6 is fastened to and is pressed against the blade carrier (2a), thereby clamping each cutting blade (4a) between the blade carrier (2a) and the corresponding pressing member 6.

The fixing members 7 are disposed between one of the cutting blades (4a) and a corresponding one of the pressing members 6. Each of the fixing members 7 has one end extending through one of the through holes 44 and press-fitted into a corresponding one of the main fixing holes 23, and an opposite end press-fitted into a corresponding one of the auxiliary fixing holes 62. Apart from being pressed between the blade carrier (2a) and the corresponding pressing member 6, each cutting blade (4a) can be positioned more stably on the blade carrier (2a) through the press-fitting configuration of the fixing members 7, so that the accurate disposition of each cutting blade (4a) can be enhanced. During planing, with each cutting blade (4a) being clamped between the blade carrier (2a) and the corresponding pressing member 6, each cutting blade (4a) can achieve a stable effect.

It should be noted herein that, in this embodiment, the blade carrier (2a) has a four-sided shape, and the number of each of the cutting blade (4a) and the pressing member 6 is two, which are disposed on two opposite sides of the blade carrier (2a). However, the number of each of the cutting blade (4a) and the pressing member 6 may be four, which may then be disposed on each side of the blade carrier (2a), and is not limited to the aforesaid disclosure.

Further, in this embodiment, each positioning member 3 is also hidden within the drive shaft (1a) just like the first embodiment, so that removal of the positioning members 3 by mistake during replacement of the cutting blades (4a) can be prevented.

Figure 11:
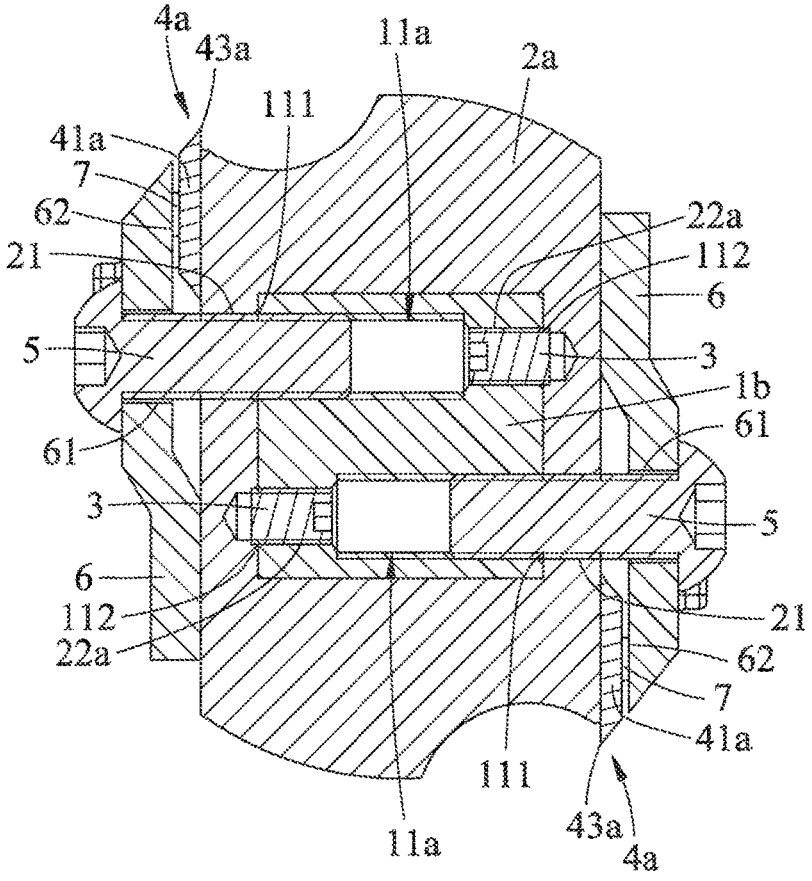
FIG. 11 is a view similar to FIG. 10, but illustrating a cutter head assembly according to the fifth embodiment of the present disclosure.

Referring to FIG. 11, the fifth embodiment of the cutter head assembly is shown to be similar to the fourth embodiment. The difference between the fourth and fifth embodiments resides in that the drive shaft (1b) has a four-sided cross section.

The advantages of the cutter head assembly of this disclosure can be summarized as follows:

1. The drive shaft 1, 1', 1", 1a, 1b is made of steel, while the blade carrier 2, 2', 2", 2a is made of aluminum alloy. Through this combination, in comparison with the conventional cutter head assembly, the weight of the cutter head assembly of this disclosure is light. With the same force that rotates the drive shaft 1, 1', 1i", 1a, 1b about the longitudinal axis (L), the rotation efficiency of the drive shaft 1, 1', 1i", 1a, 1b and the blade carrier 2, 2', 2", 2a is enhanced, thereby reducing the energy consumption.
2. Because the blade carrier 2, 2', 2", 2a is made of aluminum alloy, it does not easily rust.
3. By using the aluminum alloy to make the blade carrier 2, 2', 2", 2a instead of metal iron, the cost of the cutter head assembly of this disclosure can be effectively reduced.
4. Each positioning member 3, 3' is hidden within the drive shaft 1, 1', 1", 1a, 1b, so that removal of the positioning members 3 by mistake during replacement of the cutting blades 4, 4a can be prevented. Further, separation between the drive shaft 1, 1', 1", 1a, 1b and the blade carrier 2, 2', 2", 2a can also be avoided.

Therefore, the object of this disclosure can be realized.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A cutter head assembly comprising:

a drive shaft having a longitudinal axis and made of steel, said drive shaft having an outer surface formed with a plurality of first positioning sections;

a blade carrier sleeved and retained on said drive shaft, said blade carrier having a length extending parallel to the longitudinal axis, being made of aluminum alloy, and including a plurality of second positioning sections respectively communicating with said first positioning sections;

a blade unit disposed on said blade carrier[and surrounding the longitudinal axis]; and a plurality of positioning members fixed between said drive shaft and said blade carrier, each of said positioning members being disposed between one of said first positioning sections and a corresponding one of said second positioning sections to prevent rotational displacement of said blade carrier relative to said drive shaft;

wherein each of said positioning members is configured as a rod extending parallel to the longitudinal axis, each of said first positioning sections being configured as an inner engaging groove extending along the length of said drive shaft, each of said second positioning sections being configured as an outer engaging groove extending along the length of said blade carrier, each of said positioning members being fixedly disposed between one of said first positioning sections and a corresponding one of said second positioning sections.

2. The cutter head assembly as claimed in claim 1, wherein said blade carrier includes a plurality of spaced-apart fastening holes[surrounding said drive shaft], and said blade unit includes a plurality of cutting blades each of which has at least one through hole communicating with a respective one of said fastening holes.

3. The cutter head assembly as claimed in claim 2, further comprising a plurality of fastening members each of which extends through said at least one through hole of one of said cutting blades and engages threadedly and detachably a corresponding one of said fastening holes to fasten each of said cutting blades to said blade carrier.

4. The cutter head assembly as claimed in claim 3, wherein each of said cutting blades includes a blade body having said at least one through hole, and at least one cutting edge formed on a longitudinal side of said blade body, and wherein a distance along the longitudinal axis of said drive shaft and between said cutting edges of two adjacent ones of said cutting blades that are circumferentially spaced apart from each other is smaller than a length of each of said cutting edges along the longitudinal axis.

5. The cutter head assembly as claimed in claim 4, wherein each of said cutting blades includes one said cutting edge formed on the longitudinal side of said blade body, said blade body has one said through hole, and each of said fastening members extends through said through hole of one of said cutting blades and engages a corresponding one of said fastening holes.

6. The cutter head assembly as claimed in claim 4, wherein said blade body of each of said cutting blades is elongated and extends parallel to the longitudinal axis, each of said cutting blades including a plurality of said cutting edges formed on the longitudinal side of said blade body, and further including a plurality of spacer sections each of which is disposed between two adjacent ones of said cutting edges.

7. A cutter head assembly comprising:

a drive shaft having a longitudinal axis and made of steel, said drive shaft having an outer surface formed with a plurality of first positioning sections;

a blade carrier sleeved and retained on said drive shaft, said blade carrier having a length extending parallel to the longitudinal axis, being made of aluminum alloy, and including a plurality of second positioning sections respectively communicating with said first positioning sections;

a blade unit disposed on said blade carrier[and surrounding the longitudinal axis]; and a plurality of positioning members fixed between said drive shaft and said blade carrier, each of said positioning members being disposed between one of said first positioning sections and a corresponding one of said second positioning sections to prevent rotational displacement of said blade carrier relative to said drive shaft;

wherein each of said positioning members is configured as a threaded bolt, each of said first positioning sections being configured as a through hole extending through said drive shaft and having a large-diameter portion and a small-diameter portion opposite to and communicating with said large-diameter portion, each of said second positioning sections communicating with said small-diameter portion of the respective one of said first positioning sections, each of said positioning members extending through said large-diameter portion of one of said first positioning sections and fixedly engaging said small-diameter portion of said one of said first positioning sections and a corresponding one of said second positioning sections.

8. The cutter head assembly as claimed in claim 7, further comprising a plurality of fastening members for fastening said cutting blades to said blade carrier, said blade carrier further including a plurality of fastening holes respectively communicating with said large-diameter portions of said first positioning sections, each of said fastening members extending through one of said fastening holes and fixedly engaging said large-diameter portion of a corresponding one of said first positioning sections.

9. The cutter head assembly as claimed in claim 8, further comprising a plurality of pressing members fastened to said blade carrier, said blade carrier further including a plurality of spaced-apart fastening holes and a plurality of spaced-apart main fixing holes[surrounding the longitudinal axis], said blade unit including a plurality of cutting blades each of which is disposed between said blade carrier and a corresponding one of said pressing members, each of said cutting blades having a plurality of through holes respectively communicating with said main fixing holes, each of said pressing members including a plurality of [threaded] holes corresponding to said fastening holes, and a plurality of auxiliary fixing holes corresponding to said main fixing holes.

10. The cutter head assembly as claimed in claim 9, further comprising a plurality of fixing members each of which is disposed between one of said cutting blades and a corresponding one of said pressing members, each of said fixing members having one end extending through one of said through holes into a corresponding one of said main fixing holes, and an opposite end extending into a corresponding one of said auxiliary fixing holes to fix each of said cutting blades to said blade carrier.

11. The cutter head assembly as claimed in claim 10, wherein said drive shaft has a circular cross section.

12. The cutter head assembly as claimed in claim 10, wherein said drive shaft has a four-sided cross section.

*13. A cutter head assembly comprising:*

*a drive shaft having a longitudinal axis and made of a first metal, said drive shaft having an outer surface formed with a plurality of first positioning sections;*

*a blade carrier sleeved and retained on said drive shaft, said blade carrier having a length extending parallel to the longitudinal axis, being made of a second metal different from said first metal, and including a plurality of second positioning sections respectively communicating with said first positioning sections;*

*a blade unit disposed on said blade carrier; and*

*a plurality of positioning members fixed between said drive shaft and said blade carrier, each of said positioning members being disposed between one of said first positioning sections and a corresponding one of said second positioning sections to prevent rotational displacement of said blade carrier relative to said drive shaft;*

*wherein each of said positioning members is configured as a rod extending parallel to the longitudinal axis, each of said first positioning sections being configured as an inner engaging groove extending along the length of said drive shaft, each of said second positioning sections being configured as an outer engaging groove extending along the length of said blade carrier, each of said positioning members being fixedly disposed between one of said first positioning sections and a corresponding one of said second positioning sections.*

*14. The cutter head assembly as claimed in claim 13, wherein said blade carrier includes a plurality of spaced-apart fastening holes, and said blade unit includes a plu-*

*rality of cutting blades each of which has at least one through hole communicating with a respective one of said fastening holes.*

*15. The cutter head assembly as claimed in claim 14, further comprising a plurality of fastening members each of which extends through said at least one through hole of one of said cutting blades and engages threadedly and detachably a corresponding one of said fastening holes to fasten each of said cutting blades to said blade carrier.*

*16. The cutter head assembly as claimed in claim 15, wherein each of said cutting blades includes a blade body having said at least one through hole, and at least one cutting edge formed on a longitudinal side of said blade body, and wherein a distance along the longitudinal axis of said drive shaft and between said cutting edges of two adjacent ones of said cutting blades that are circumferentially spaced apart from each other is smaller than a length of each of said cutting edges along the longitudinal axis.*

*17. The cutter head assembly as claimed in claim 16, wherein each of said cutting blades includes one said cutting edge formed on the longitudinal side of said blade body, said blade body has one said through hole, and each of said fastening members extends through said through hole of one of said cutting blades and engages a corresponding one of said fastening holes.*

*18. The cutter head assembly as claimed in claim 16, wherein said blade body of each of said cutting blades is elongated and extends parallel to the longitudinal axis, each of said cutting blades including a plurality of said cutting edges formed on the longitudinal side of said blade body, and further including a plurality of spacer sections each of which is disposed between two adjacent ones of said cutting edges.*

*19. The cutter head assembly as claimed in claim 13, wherein said drive shaft and said blade carrier are in direct contact at an interface, each of said plurality of positioning members penetrate said interface.*

*20. The cutter head assembly of claim 14, wherein an outer surface of said blade carrier comprises a first plane extending in a direction parallel to said longitudinal axis and a second plane unparalleled to said first plane.*

*21. The cutter head assembly of claim 20, wherein each of said cutting blade comprises:*

*a back surface conforming with said first plane; and a sidewall conforming with said second plane.*

*22. The cutter head assembly of claim 16, wherein said blade carrier comprises a recessed area proximal to each of said cutting edge and extending in a direction parallel to said longitudinal axis.*

*23. A cutter head assembly comprising:*

*a drive shaft having a longitudinal axis and made of a first metal, said drive shaft having an outer surface formed with a plurality of first positioning sections;*

*a blade carrier sleeved and retained on said drive shaft, said blade carrier having a length extending parallel to the longitudinal axis, being made of a second metal different from said first metal, and including a plurality of second positioning sections respectively communicating with said first positioning sections;*

*a blade unit disposed on said blade carrier; and*

*a plurality of positioning members fixed between said drive shaft and said blade carrier, each of said positioning members being disposed between one of said first positioning sections and a corresponding one of said second positioning sections to prevent rotational displacement of said blade carrier relative to said drive shaft;*

*wherein each of said positioning members is configured as a threaded bolt, each of said first positioning sections being configured as a through hole extending through said drive shaft and having a large-diameter portion and a small-diameter portion opposite to and communicating with said large-diameter portion, each of said second positioning sections communicating with said small-diameter portion of the respective one of said first positioning sections, each of said positioning members extending through said large-diameter portion of one of said first positioning sections and fixedly engaging said small-diameter portion of said one of said first positioning sections and a corresponding one of said second positioning sections.*

*24. The cutter head assembly as claimed in claim 23, further comprising a plurality of fastening members for fastening said cutting blades to said blade carrier, said blade carrier further including a plurality of fastening holes respectively communicating with said large-diameter portions of said first positioning sections, each of said fastening members extending through one of said fastening holes and fixedly engaging said large-diameter portion of a corresponding one of said first positioning sections.*

*25. The cutter head assembly as claimed in claim 24, further comprising a plurality of pressing members fastened to said blade carrier, said blade carrier further including a plurality of spaced-apart fastening holes and a plurality of spaced-apart main fixing holes, said blade unit including a plurality of cutting blades each of which is disposed between said blade carrier and a corresponding one of said pressing members, each of said cutting blades having a plurality of through holes respectively communicating with said main fixing holes, each of said pressing members including a plurality of holes corresponding to said fastening holes, and a plurality of auxiliary fixing holes corresponding to said main fixing holes.*

*26. The cutter head assembly as claimed in claim 25, further comprising a plurality of fixing members each of which is disposed between one of said cutting blades and a corresponding one of said pressing members, each of said fixing members having one end extending through one of said through holes into a corresponding one of said main fixing holes, and an opposite end extending into a corresponding one of said auxiliary fixing holes to fix each of said cutting blades to said blade carrier.*

*27. The cutter head assembly as claimed in claim 23, wherein said drive shaft has a circular cross section.*

*28. The cutter head assembly as claimed in claim 23, wherein said drive shaft has a four-sided cross section.*

*29. The cutter head assembly as claimed in claim 23, wherein said drive shaft and said blade carrier are in direct contact at an interface, each of said plurality of positioning members penetrates said interface.*

*30. The cutter head assembly as claimed in claim 23, wherein said blade unit comprises a plurality of cutting blades in direct contact with an outer surface of said blade carrier, each of said cutting blades includes one cutting edge.*

*31. The cutter head assembly of claim 30, wherein said outer surface of said blade carrier comprises a first plane extending in a direction parallel to said longitudinal axis and a second plane unparalleled to said first plane.*

*32. The cutter head assembly of claim 31, wherein each of said cutting blade comprises:*

*a front surface facing away from the blade carrier; a back surface conforming with said first plane; and a sidewall conforming with said second plane.*

*33. The cutter head assembly of claim 30, wherein said blade carrier comprises a recessed area proximal to each of said cutting edge and extending in a direction parallel to said longitudinal axis.*

*34. The cutter head assembly of claim 31, wherein said plurality of positioning members comprises a first positioning member, said first positioning member has an end pointing toward said first plane.*

*35. The cutter head assembly of claim 34, wherein said first positioning member extends in a direction perpendicular to said first plane.*

*36. The cutter head assembly of claim 34, further comprising a first fastening member in direct contact with one of said cutting blades.*

*37. The cutter head assembly of claim 36, wherein said first fastening member is a threaded bolt.*

*38. The cutter head assembly of claim 36, wherein said first fastening member has an orientation relative to said longitudinal axis identical to an orientation of said first positioning member relative to said longitudinal axis.*

*39. The cutter head assembly of claim 36, wherein said first fastening member is apart from said first positioning member.*

* * * * *